May 29, 1945.　　A. J. LALIBERTE　　2,376,876
LIGHT WEIGHT PORTABLE STILL
Filed April 7, 1943　　2 Sheets-Sheet 2
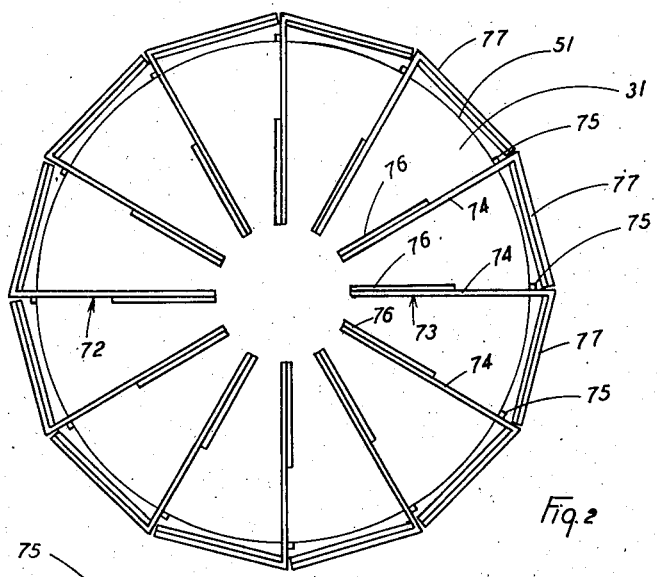
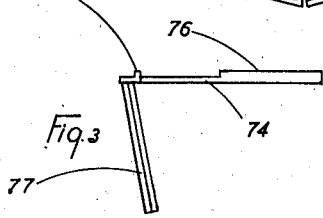
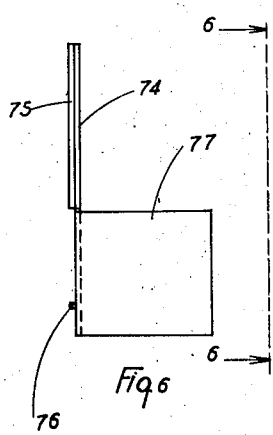
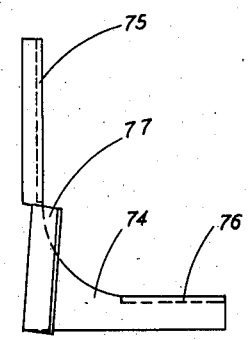
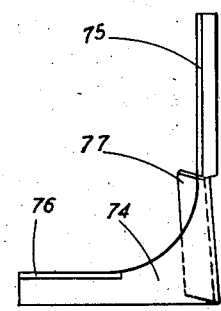
INVENTOR.
ALBERT J. LALIBERTE Patented May 29, 1945

2,376,876

UNITED STATES PATENT OFFICE 2,376,876

LIGHTWEIGHT PORTABLE STILL

Albert J. Laliberte, Naugatuck, Conn., assignor to Safety Fuel, Incorporated, West Cheshire, Conn., a corporation of Connecticut Application April 7, 1943, Serial No. 482,104

5 Claims. (Cl. 202—235)

This invention relates to a new and useful improvement in portable stills and particularly in lightweight portable stills such as are used for "abandon ship" use to generate fresh potable water from water that is salty and/or contaminated. Such stills include a stove, a closed vessel for boiling the salty or contaminated water, a duct for conducting the steam from the boiling vessel, a receptacle for the condensate produced by condensing the steam, and a condenser which may be constituted in whole or in part by said duct and/or said receptacle. Such stills must be relatively light, preferably not exceeding 25 pounds in weight, and since fuel is necessarily limited in amount under the conditions of use, should yield the largest possible amount of potable water for each unit of fuel consumed.

The object of this invention is an increase in the thermal efficiency of and yield of potable water from each unit of fuel consumed and the application describes and claims a construction whereby this object is accomplished. The invention will be fully understood from the description read in conjunction with the drawings in which:

Fig. 2 is a view of part of the construction shown in Fig. 1 on the plane indicated by 2—2;

Fig. 3 is a top view of a part of the construction shown in Fig. 2;

Fig. 4 is a side view of the construction shown in Fig. 3;

Fig. 5 is a reverse side view of the same; and

Fig. 6 is a view of the construction shown in Fig. 4 on the plane indicated by 6—6.

Figure 1:
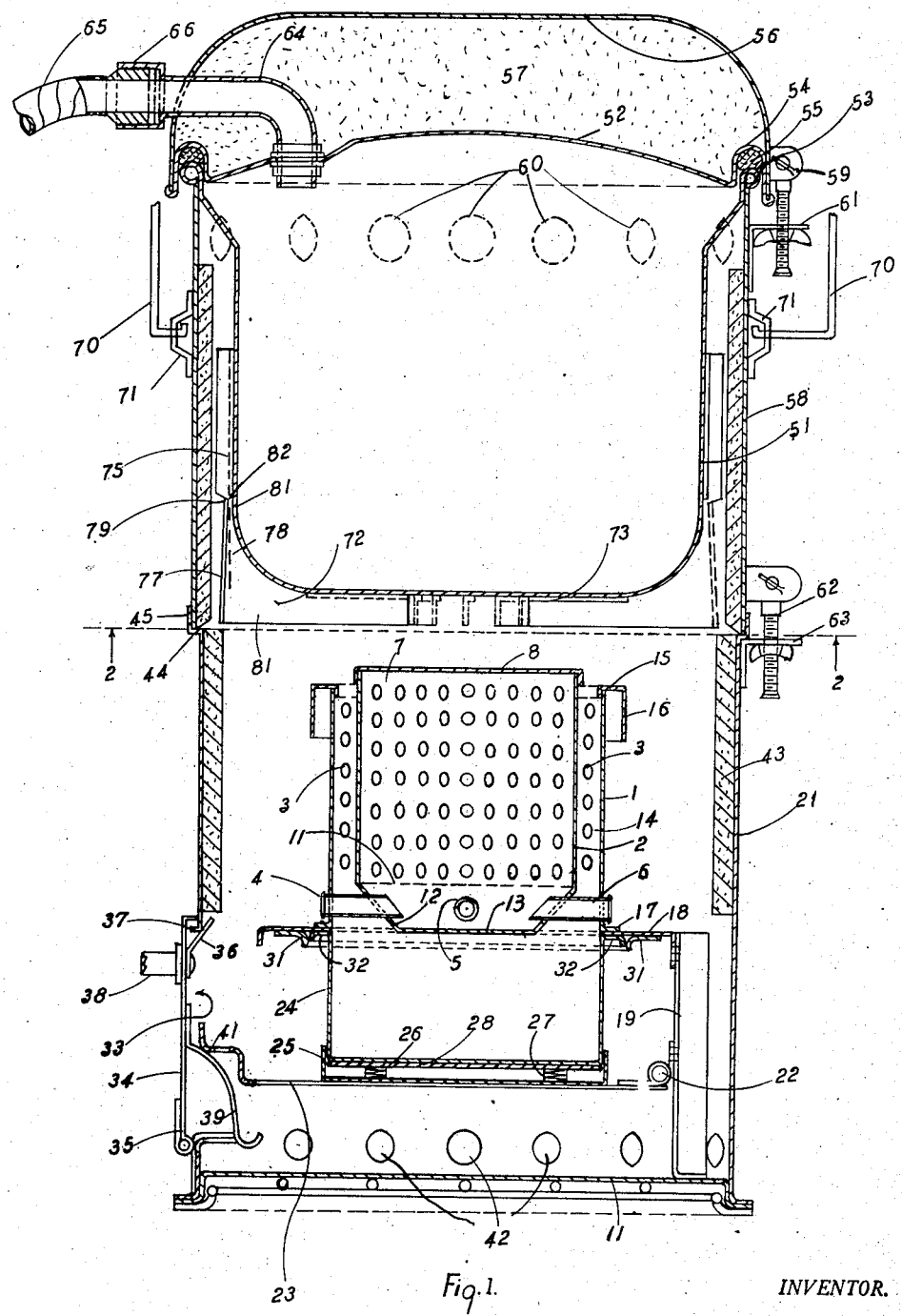
Fig. 1 is a longitudinal vertical section through an embodiment of my invention.

Referring to the drawings, 1 is a tubular flue preferably, although not necessarily, of circular cross-section; 2 is a second tubular flue of similar cross section, at least substantially co-axial with 1. Flue 1 carries perforations 3 preferably uniformly distributed and extending down to approximately the upper edge of air inlets 4, 5, and 6. These perforations preferably run between 14 and 16 holes of approximately $\frac{1}{16}$" diameter to the square inch. Flue 2 carries similar perforations 7 also preferably uniformly distributed and extending down to the upper edge of the air inlets 4, 5 and 6. The upper end of the internal flue 2 is provided with the cap 8, preferably imperforate and in any event substantially imperforate. From a line 11, slightly above the upper edge of the horizontal air inlets the internal flue 2 is leveled inwardly at 12 and provided with a bottom closure 13. The annular space between the flues 1 and 2 is a combustion zone within which combustion of hydrocarbon vapors proceeds actively when the device is in use. Air is brought into the combustion zone 14 from the exterior of the flue 1 through the perforations 3 and from the interior of the flue 2 through the perforations 7. Air is brought into the space defined by the flue 2, cup 8 and bottom closure 13 by means of the horizontal air inlets. These horizontal air inlets are symmetrically distributed and there is, therefore, one such additional air inlet in that portion of the device which faces the observer and, therefore, does not appear in Fig. 1. Flue 2 is supported in position by these horizontal air inlets which are held in holes provided for this purpose in the external flue 1. From the upper edge of the flue 1 that extends outwardly the horizontal flange 15 and thence downwardly, the skirt or sleeve 16 thereby forming an annular imperforate hood surrounding the perforations in the upper part of flue 1. Flue 1 is provided adjacent the lower edge thereof with the annular flange 17 by which it is spot welded or similarly secured to the shelf 18. Shelf 18 is riveted or spot welded to the upstanding rail 19. The stove is provided with an outer shell or casing 21 and the shelf 18 is also secured in position by riveting or welding the corners of the shelf 18 to the inside of the casing 21. The hinge 22 is also secured to the rail 19 and is in turn secured to the shelf 23. The container 24 is held in position on the shelf 23 by means of the shell or cup 25 spot welded or similarly secured to the shelf 23. Within the cup are springs 26 and 27 bearing against the disc 28 by which the container 24 is forced upwardly into firm engagement with the lower surface of the shelf 18. The container is held in registry with the periphery of the combustion space 14 by means of the annular flange 31 spot welded or similarly secured to the shelf 18. The stove illustrated is for use with a solidified normally fluid fuel, preferably a solidified hydrocarbon and more preferably a solidified naphtha or gasoline. This solidified fuel may be held in the container 24 but since this container must be fabricated with care so that the upper rim 32 of the same forms a fairly tight seal with the lower face of the shelf 18. The container 24 is preferably used as a master container that is a permanent part of the stove while the solidified fuel is supplied in relatively inexpensive metal cans. For use the cover of the can is removed and the can with the solidified fuel therein is slipped into the master container 24. For this purpose, the casing 21 is provided with a port 33 which may be closed by the door 34 pivotally carried by the hinge 35 spot welded or similarly secured to the lower edge of casing 21. The door may be held in position by the latch 36 which engages the edge 37 of the casing 21 and which may be operated by a handle, not shown, through the post 38. The door 34 is provided with a camming surface 39, which cooperates with the projection 41 formed in the adjacent end of the shelf 23. When the door 34 is opened this camming surface permits the end of the shelf 23 adjacent the door to drop, the shelf moving pivotally with respect to the axis of hinge 22. In this position, the master container 24 may be removed through door 34 and a can of solidified fuel from which the cover has been removed placed therein. The master container is then returned to its position in the cup 25, the fuel is ignited and the door 34 is closed and locked in position by means of the latch whereupon the stove will function normally until the fuel in the receptacle has become exhausted. Air to support combustion passes to the inside of shell or casing 21 through the ports 42.

Preferably the upper part of the shell is provided with a layer 43 of thermal insulation. The shell 21 is also provided with a horizontally extending flange 44 and an upstanding retainer ring 45 by which the distilling or boiling elements are supported and retained.

These include the boiling vessel 51 provided with the removable cover 52. The vessel 51 is provided with a rolled over edge 53 while the cover 52 is provided with an annular recess 54 within which is located the annular sealing ring or gasket 55 whereby the vessel 51 is closed and sealed. To increase the thermal efficiency, cover 52 is also provided with a shell 56 and with suitable thermal insulation held between cover 52 and shell 56.

The rolled over edge 53 of the boiling vessel rests on the upper edge of casing 58 surrounding the boiling vessel and this in turn is supported by the annular flange 45. The gaseous combustion products after they have imparted heat to the boiling vessel escape through ports 60 in the upper end of shell 58. The shell 56 is provided with swing nuts 59, of which one is shown in Fig. 1 cooperating with projecting flanges such as 61 secured to the side wall of casing 58, by means of which the cover 52 may be readily removed or replaced. The casing 58 is also provided with swing nuts such as 62 of which one is shown in Fig. 1, cooperating with projecting flange such as 63 secured to the side wall of casing 21. By means of which the boiling vessel assembly may, if desired, be easily removed from the stove or replaced in the position shown. Steam generated in the boiling vessel 51 is conducted away through the vapor outlet 64 and through a flexible hose 65 secured to the vapor outlet 64 by the union 66. Some means must, of course, be provided for condensing the steam so evolved and for this purpose the flexible tube 65 may be of sufficient length so that a part of it can be immersed, out-board, in the seawater, or, alternatively, a canteen may be fitted to the end of the flexible tube 65, which canteen may be immersed in the sea water to serve both as condenser for the steam and as a receptacle for the condensate.

The entire assembly may be carried by means of bale 70 secured to sockets 71, spot welded or similarly secured to the outside of shell 58.

This invention is particularly concerned with a structure whereby the thermal efficiency of the device as a whole is materially increased and whereby a favorable ratio of potable water to fuel consumed may be obtained.

With reference to Fig. 1, it will be noted that the lower part of the boiling vessel 51 is provided with projecting fins of which 72 and 73 appear in the figure. By reference to Fig. 2 it will be noted that there are altogether twelve of these fins symmetrically disposed with respect to the lower part of the boiling vessel 51. By reference to Figs. 4-6 inclusive, it will be seen that each fin consists of a web 74 which in Figs. 1 and 2 is oriented radially with respect to the axis of the boiling vessel. In addition, each fin is provided with a turned-over flange 75 by which it is spot welded or similarly secured to the side wall of the boiling vessel and with a turned over flange 76 by which it is similarly spot welded or otherwise secured to the bottom of the boiling vessel, 51. Each fin is also provided with a transversely extending member 77. This is preferably formed integral with the fin by first cutting a blank to include the radial web No. 74, the flanges 75 and 76 as well as the transversely extending member 77, and therafter, bending the flanges 75 and 76 to a right angle with the radial web No. 74 as shown in Figs. 4-6, inclusive, and bending the tab forming the transversely extending member 77 to a right angle with the radial web No. 74, to the position shown in Figs. 4-6.

By reference to Fig. 2 it will be further noted that these transversely extending members 77 extend from one fin substantially to the adjacent fin and collectively substantially encircle the axis. The path of the heated gaseous products of combustion rising from the stove is in general radially outward adjacent the bottom of the boiling vessel 51, whereas the transversely extending members 77 are interposed directly in the radial path of the gaseous products of combustion. It will also be noted from Fig. 1 that these transverse members are spaced apart from the side wall of the boiling vessel 51 thereby forming a space therebetween through which the gaseous products of combustion may move upwardly in contact with the side wall of the boiling vessel. In Fig. 1 I have drawn a line 78 parallel to the axis and roughly midway between the outer edge of the boiling vessel and the innermost edge of the transversely extending member 77; the upper edge 79 of transversely extending member 77 in combination with the adjacent part 81 of the side wall of the boiling vessel 51, forming slot 82 through which the gaseous products of combustion are discharged upwardly. The line 78 is parallel to the vertical axis of the boiling vessel and approximately in the central position within the slot 82. By reference to this line and to the upper end of the slot it will be evident that the upper edge 79 of the transversely extending member 77 and the adjacent portion 81 of the boiling vessel are roughly symmetrical to the line 78 thereby forming at this point an outlet by which gaseous products of combustion are directed upwardly in a direction substantially parallel to the side wall of the boiling vessel 51. This feature is of importance to the attainment of the maximum thermal efficiency.

The method of operation of the device is as follows:

When it is desired to obtain fresh water as for example, from sea water, the cover 52 is removed by means of swing nuts such as 59, a quantity of salt water is introduced into the boiling vessel, the amount to be introduced being indicated by a suitable marker on the inside of the boiling vessel and thereafter the cover 52 is replaced and the swing nuts tightened. The flexible tube 65 is then connected to the receiver for the portable water; with the device in upright position the cover is removed from a can of fuel and the can is placed in master container 24, which then is positioned in the cup 25 in the manner hereinabove described. The fuel is then ignited by means of a match or lighter and the door 34 is closed. Within a few minutes the stove will burn with a clear blue flame and when the water in the vessel 51 has reached the boiling point steam will be evolved. If the receiver functions also as a condenser it must from this time on be kept submerged and if, alternatively, the tube 65 is to function as a condenser, a part of this must be kept submerged while the end remote from the union 66 is carried in-board to the receiver. From this point on distillation and condensation proceed automatically. The conclusion of a run is indicated by the appearance of a light smoke from the outlets 60 indicating the substantial exhaustion of the fuel.

The fresh potable water is removed from the receiver at the conclusion of such a run; the boiling vessel 51 is emptied of the concentrated salt water left therein and refilled with fresh salt water; the cover is then replaced, secured in position and connected through flexible tube 65 to the receiver; a new charge of fuel may be introduced into the stove and ignited whereupon the operation will be repeated in the same manner.

By means of the special fin structure hereinabove described, I have found it entirely possible to obtain yields of fresh potable water from salt water as great as twelve times the weight of the solidified fuel consumed.

The foregoing description is for purposes of illustration and not of limitation and it is therefore my intention that the invention be limited only by the appended claims or their equivalents in which I have endeavored to claim broadly all inherent novelty.

I claim:

1. In a portable still including a boiling vessel and beneath said vessel a stove for burning solidified normally liquid fuel; radially disposed metallic fins carried by the under-surface of said vessel and metallic members extending transversely from at least a part of said fins spaced apart from the bottom of said still, said members extending transversely forming with the bottom of said vessel, a discharge outlet adapted to direct gases substantially parallel to the side wall of said vessel.

2. In a portable still including a boiling vessel and beneath said vessel, a stove for burning solidified normally liquid fuel; radially disposed metallic fins carried by the under and the lower vertical surfaces of said vessel and metallic members extending transversely from at least a part of said fins spaced apart from the bottom of said vessel, said members extending transversely forming with the bottom of said vessel, a discharge outlet adapted to direct gases substantially parallel to the side wall of said vessel.

3. In a portable still including a boiling vessel and beneath said vessel a stove for burning solidified normally liquid fuel; radially disposed metallic fins carried by the under-surface of said vessel and metallic members located adjacent the bilge of said vessel extending transversely from at least a part of said fins and spaced apart from the bottom of said vessel, said members extending transversely forming with the bottom of said vessel a discharge outlet adapted to direct gases substantially parallel to the side wall of said vessel.

4. In a portable still including a boiling vessel and beneath said vessel a stove for burning solidified normally liquid fuel; radially disposed metallic fins carried by the under-surface of said vessel and metallic members spaced apart from the bottom of said vessel, extending transversely from at least part of said fins at least substantially to the adjacent fin, said members extending transversely forming with the bottom of said vessel, a discharge outlet adapted to direct gases substantially parallel to the side wall of said vessel.

5. In a portable still including a boiling vessel and beneath said vessel a stove for burning solidified normally liquid fuel, radially disposed metallic fins carried by the under and lower vertical surfaces of said vessel, metallic members spaced apart from the bottom of said vessel, extending transversely from at least part of said fins at least substantially to the adjacent fin, said members extending transversely forming with the bottom of said vessel a discharge outlet adapted to direct gases substantially parallel to the side wall of said vessel.

ALBERT J. LALIBERTE.